United States Patent
Testa et al.

(10) Patent No.: US 9,806,841 B2
(45) Date of Patent: Oct. 31, 2017

(54) OPTICAL SWITCH, AN OPTICAL SWITCHING APPARATUS, AN OPTICAL COMMUNICATIONS NETWORK NODE AND AN OPTICAL COMMUNICATIONS NETWORK

(71) Applicant: Telefonaktiebolaget LM Ericsson (publ), Stockholm (SE)

(72) Inventors: Francesco Testa, Pisa (IT); Alberto Bianchi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/313,193

(22) PCT Filed: May 23, 2014

(86) PCT No.: PCT/EP2014/060621
§ 371 (c)(1),
(2) Date: Nov. 22, 2016

(87) PCT Pub. No.: WO2015/176764
PCT Pub. Date: Nov. 26, 2015

(65) Prior Publication Data
US 2017/0141870 A1    May 18, 2017

(51) Int. Cl.
*H04J 14/00* (2006.01)
*H04J 14/02* (2006.01)
(Continued)

(52) U.S. Cl.
CPC ...... *H04J 14/0212* (2013.01); *H04J 14/0294* (2013.01); *H04Q 11/0066* (2013.01);
(Continued)

(58) Field of Classification Search
CPC .............. H04J 14/0201; H04J 14/0202; H04J 14/0204; H04J 14/0205; H04J 14/0206;
(Continued)

(56) References Cited

U.S. PATENT DOCUMENTS

2002/0039470 A1* 4/2002 Braun ................ G02B 6/12002
385/50
2015/0381301 A1* 12/2015 Jeong ................ G02B 6/29397
398/79

OTHER PUBLICATIONS

Analysis and Design of Micro-Ring Based Switch Elements in Silicon Photonics for Optical Interconnection by Pietro Contu et al.; IEEE—2013.
(Continued)

*Primary Examiner* — Daniel Dobson
(74) *Attorney, Agent, or Firm* — Baker Botts, LLP

(57) ABSTRACT

An optical switch, comprising: a first optical waveguide, a first optical add path, a second optical add path and a micro-ring resonator. The micro-ring resonator is operable to add a first optical signal at a preselected wavelength received from the first optical add path to the first optical waveguide to travel in a first direction through the first optical waveguide. The micro-ring resonator is further operable to add a second optical signal at the preselected wavelength received from the second optical add path to the first optical waveguide to travel in a second direction through the first optical waveguide opposite to the first direction. There is also provided an optical drop switch, an optical switching apparatus, an optical communications network node and an optical communications network.

19 Claims, 6 Drawing Sheets

(51) Int. Cl.
 *H04Q 11/00* (2006.01)
 *H04B 10/00* (2013.01)
(52) U.S. Cl.
 CPC .............. *H04Q 2011/0016* (2013.01); *H04Q 2011/0039* (2013.01); *H04Q 2011/0081* (2013.01)
(58) Field of Classification Search
 CPC .. H04J 14/0208; H04J 14/0209; H04J 14/021; H04J 14/0212; H04J 14/0213; H04J 14/0215; H04J 14/0216; H04J 14/0217; H04J 14/0219; H04J 14/022; G02B 6/12007; G02B 6/29343
 See application file for complete search history.

(56) References Cited

OTHER PUBLICATIONS

Cascaded Microresonator-Based Matrix Switch for Silicon On-Chip Optical Interconnection; Experiments have demonstrated proof of the concept that cascaded arrays of optical microresonators can switch interconnections as desired between multiple signal inputs and outputs without significant distortion. by Andrew W. Poon et al.; Invited Paper; Proceedings of the IEEE; vol. 97, No. 7—Jul. 2009.
International Search Report for International application No. PCT/EP2014/060621—Jan. 23, 2015.
Transmission of 10Gb/s Per Wavelength in a Hybrid WDM/TDM Access Network Providing Bandwidth On-Demand; IEEE—2009.
A Performance Comparison of WSS Switch Engine Technologies; JDSU; White Paper—May 2009.

\* cited by examiner

US 9,806,841 B2

OPTICAL SWITCH, AN OPTICAL SWITCHING APPARATUS, AN OPTICAL COMMUNICATIONS NETWORK NODE AND AN OPTICAL COMMUNICATIONS NETWORK

PRIORITY

This non-provisional application is a U.S. National Stage Filing under 35 U.S.C. §371 of International Patent Application Serial No. PCT/EP2014/060621, filed May 23, 2014, and entitled "An Optical Switch, an Optical Switching Apparatus, an Optical Communications Network Node and an Optical Communications Network".

TECHNICAL FIELD

The present invention relates to an optical switch, an optical switching apparatus, an optical communications network node and an optical communications network, which may, in particular but not exclusively, be a radio access network.

BACKGROUND

FIG. 1 illustrates a Radio Access Network (RAN). In this example, the RAN comprises a plurality of fronthaul networks 10 and a backhaul network 20.

Each of the fronthaul networks 10 comprises a plurality of Remote Radio units, RRUs 30 (which may also be referred to as Radio Equipments REs). These REs 30 are located at respective geographical sites, and are each coupled to one or more radio antennas 40. Each RE 30 is coupled to a respective fronthaul network node 50. In this example, each fronthaul network 10 further comprises a pool of baseband units (which may be referred to as radio equipment controllers RECs), which are located at a hub network node 55. This hub node 55 may be a few kilometers away from each of the REs 30.

In order to effectively handle communication between the pool of RECs and the respective REs 30, optical WDM (wavelength-division-multiplexed) networks are considered a promising technology. This is because optical WDM networks may provide high bandwidth and scalability, low latency and also high fibre utilisation and a high level of resilience.

In an optical WDM ring network, the pool of RECs may use respective wavelengths to communicate with respective REs 30. These wavelengths are multiplexed by the hub node 55 into a downlink WDM signal which is transmitted around the ring. Each of the network nodes 50 drops only the wavelength(s) for its RE 30, and allows the other wavelengths to pass further around the ring. Each of the network nodes 50 may also add one or more respective wavelengths from its RE 30 to an uplink WDM signal which is also transmitted around the ring, to the hub node 55.

The mobile traffic from each fronthaul network 10 is aggregated by respective router cards 70 and sent via the backhaul network 20 to edge nodes 80. From the edge nodes 80, the aggregated mobile traffic is transmitted through the IP core network, which is indicated at reference numeral 90. The backhaul network 20 may, similarly, comprise an optical WDM ring network.

However, WDM optical networks use wavelength selective switches (WSSs) which, since they are based on complex free space optics, are costly and bulky devices. This has prohibited the adoption of WDM optical networks in radio access networks. In radio access networks, the capacities to be transported are lower than in transport networks. Further, the required performance level of optical switches may be lower, since, in radio access networks, optical signals may need to traverse fewer nodes and the links between the nodes may be shorter than in transport networks.

An alternative to using WSS's is to use FOADMs (fixed optical add drop multiplexers). FOADMs may comprise a cascade of thin film filters. However, since FOADMs are passive devices, they cannot be reconfigured, for example to provide protection in the event of a fault in the WDM optical network.

SUMMARY

According to the present invention, there is provided an optical switch, comprising a first optical waveguide, a first optical add path, a second optical add path and a micro-ring resonator. The micro-ring resonator is operable to add a first optical signal at a preselected wavelength received from the first optical add path to the first optical waveguide to travel in a first direction through the first optical waveguide. The micro-ring resonator is further operable to add a second optical signal at the preselected wavelength received from the second optical add path to the first optical waveguide to travel in a second direction through the first optical waveguide opposite to the first direction.

According to the present invention, there is further provided an optical switch, comprising a first optical waveguide, a first optical drop path, a second optical drop path and a micro-ring resonator. The micro-ring resonator is operable to drop a first optical signal at a preselected wavelength travelling in a first direction through the first optical waveguide to the first optical drop path. The micro-ring resonator is further operable to drop a second optical signal at the preselected wavelength travelling in a second direction through the first optical waveguide opposite to the first direction to the second optical drop path.

The present invention has the advantage that it may provide a cheaper, more power efficient and less bulky optical switch, which also enables a protection mechanism to be implemented in an optical communications network, as will be described below. Advantageously, only a single micro-ring resonator is required in order to add wavelengths to travel in either direction through the first optical waveguide (or to drop wavelengths which travel in either direction through the first optical waveguide).

According to embodiments of the present invention, the micro-ring resonator in the optical add switch may be arranged such that the first optical signal, received from the first optical add path, passes in a clockwise direction around at least a portion of the micro-ring resonator, and the second optical signal, received from the second optical add path, passes in an anticlockwise direction around at least a portion of the micro-ring resonator.

The first optical add path may comprise a first portion of a second optical waveguide and the second optical add path may comprise a second portion of the second optical waveguide. The second optical waveguide may be arranged such that the first optical signal travels in a first direction through the first portion of the second optical waveguide, and such that the second optical signal travels in a second direction through the second portion of the second optical waveguide opposite to the first direction. This configuration may make the optical switch easier to manufacture, and therefore more reliable, than alternative configurations.

However, alternatively, for example, the first optical add path may comprise a second optical waveguide and the second optical add path may comprise a third, different optical waveguide. This alternative configuration may have better performance parameters, for example lower optical loss, in some network implementations.

In preferred embodiments of the present invention, the optical add switch may, advantageously, further comprise an optical coupling apparatus having an input configured to receive an optical signal, a first output coupled to the first optical add path and a second output coupled to the second optical add path.

This embodiment has the advantage that an optical signal can be provided to the same input, whether the optical signal is to be added in the first direction, the second direction or both directions though the first optical waveguide. Thus, when the optical switch is implemented in an optical communications node, there may, advantageously, be no need for the rest of optical node to be reconfigured, for example only a single transmitter may be required.

The optical coupling apparatus may comprise an optical power splitter which is configured to split the optical signal received at the input of the optical coupling apparatus into a first optical signal which is output from the first output (to the first optical add path) and a second optical signal which is output from the second output (to the second optical add path).

Alternatively, the optical coupling apparatus may comprise an optical switch element which has a first state in which the optical switch element is configured to selectively output the optical signal received at the input from the first output (to the first optical add path) and a second state in which the optical switch element is configured to selectively output the optical signal received at the input from the second output (to the second optical add path).

The optical switch element may further be configured to receive a first control signal and to switch between the first and second states in dependence on the first control signal (which may be provided in response to an indication that a fault has occurred in the optical network).

In a preferred embodiment of the present invention, the optical switch may comprise an optical power adjustor configured to receive an optical signal, adjust the power of the optical signal and pass the optical signal to the input of the optical coupling apparatus.

This has the advantage that, when the optical switch is implemented in an optical communications node, the optical power of the optical signal which is added to the first optical waveguide, and therefore which may be transmitted over the optical network, may be adjusted such that it is the same as the other optical signals which are transmitted over the optical network by other nodes in the network. Furthermore, since the optical power adjustor is arranged before the optical coupling apparatus, advantageously, only one optical power adjustor may be required.

The optical power adjustor may be configured to receive a control signal and to adjust the power of the optical signal in dependence on the received control signal.

Further, in a preferred embodiment of the present invention, the micro-ring resonator may have an active state and an inactive state. In the active state, the micro-ring resonator is configured to add a first optical signal at a preselected wavelength received from the first optical add path to the first optical waveguide to travel in a first direction through the first optical waveguide, and to add a second optical signal at the preselected wavelength received from the second optical add path to the first optical waveguide to travel in a second direction through the first optical waveguide opposite to the first direction. In the inactive state, the micro-ring resonator is not configured to add a first optical signal at a preselected wavelength received from the first optical add path to the first optical waveguide to travel in a first direction through the first optical waveguide or to add a second optical signal at the preselected wavelength received from the second optical add path to the first optical waveguide to travel in a second direction through the first optical waveguide opposite to the first direction.

In addition, the optical switch may further comprise a control element configured to receive a second control signal and to cause the micro-ring resonator to switch between the active state and the inactive state in dependence on the second control signal.

This preferred embodiment has the advantage that the optical add switch may, in effect, be turned ON and OFF, by a control signal.

When the micro-ring resonator is in the inactive state, the micro-ring resonator may further be configured to allow an optical signal at the preselected wavelength travelling from an end of the first optical waveguide (in the first direction or the second direction) to pass to the other end of the first optical waveguide.

Further, when the micro-ring resonator is in the active or inactive state, the micro-ring resonator may further be configured to allow optical signals which are not at the preselected wavelength travelling from an end of the first optical waveguide (in the first direction or the second direction) to pass to the other end of the first optical waveguide.

Advantageously, the optical add switch may be implemented in a single silicon photonic device (e.g. a chip).

The micro-ring resonator in the optical drop switch may also be arranged such that the first optical signal, dropped from the first optical waveguide, passes in a clockwise direction around at least a portion of the micro-ring resonator, and the second optical signal, dropped from the first optical waveguide, passes in an anticlockwise direction around at least a portion of the micro-ring resonator.

The first optical drop path may comprise a first portion of a second optical waveguide and the second optical drop path may comprise a second portion of the second optical waveguide. The second optical waveguide may be arranged such that the first optical signal travels in a first direction through the first portion of the second optical waveguide, and such that the second optical signal travels in a second direction through the second portion of the second optical waveguide opposite to the first direction. Alternatively, the first optical drop path may comprise a second optical waveguide and the second optical add path comprises a third, different optical waveguide.

In a preferred embodiment of the present invention, the optical drop switch may further comprise an optical coupling apparatus having a first input coupled to the first optical drop path, a second input coupled to the second optical drop path and an output configured to output an optical signal.

This has the advantage that the optical signal may be output from the same output, whether the optical signal was travelling in the first and or the second direction though the first optical waveguide when it was dropped by the micro-ring resonator. Thus, when the optical drop switch is implemented in an optical communications node, there may, advantageously, be no need for the rest of optical node to be reconfigured, for example only a single receiver may be required.

This optical coupling apparatus may comprise an optical switch element having a first state in which the optical switch element is configured to selectively output an optical signal received at the first input from the output and a second state in which the optical switch element is configured to selectively output an optical signal received at the second input from the output. The optical switch element may be configured to receive a third control signal and to switch between the first and second states in dependence on the third control signal. This embodiment has the advantage that the optical switch element may block crosstalk coming from the non-selected direction through the first optical waveguide. However, alternatively, this optical coupling apparatus may simple couple both inputs to the output simultaneously.

Further, in a preferred embodiment of the present invention, the micro-ring (drop) resonator may have an active state and an inactive state. In the active state the micro-ring resonator is configured to drop a first optical signal at a preselected wavelength travelling in a first direction through the first optical waveguide to the first optical drop path and to drop a second optical signal at the preselected wavelength travelling in a second direction through the first optical waveguide opposite to the first direction to the second optical drop path. In the inactive state, the micro-ring resonator is not configured to drop a first optical signal at a preselected wavelength travelling in a first direction through the first optical waveguide to the first optical drop path or to drop a second optical signal at the preselected wavelength travelling in a second direction through the first optical waveguide opposite to the first direction to the second optical drop path.

In addition, the optical drop switch may further comprise a control element configured to receive a fourth control signal and to cause the micro-ring resonator to switch between the active state and the inactive state in dependence on the fourth control signal.

Thus, advantageously, the optical drop switch may, similarly to the optical add switch, in effect, be turned ON and OFF, by a control signal.

When the micro-ring resonator is in the inactive state, the micro-ring resonator may further be configured to allow an optical signal at the preselected wavelength travelling from a first end of the first optical waveguide (in the first direction or the second direction) to pass to the other end of the first optical waveguide.

Further, when the micro-ring resonator is in the active or inactive state, the micro-ring resonator may further be configured to allow optical signals which are not at the preselected wavelength, travelling from a first end of the first optical waveguide (in the first direction or the second direction) to pass to the other end of the first optical waveguide.

Advantageously, the optical drop switch may be implemented in a single silicon photonic device (e.g. a chip).

The present invention further provides an optical switching apparatus comprising a first plurality of optical add switches as described above and/or a second plurality of optical drop switches as described above.

In a preferred embodiment of the present invention, the preselected wavelength for each of the first plurality of optical switches may be different from the preselected wavelength for each of the other of the first plurality of optical switches and/or the preselected wavelength for each of the second plurality of optical switches may be different from the preselected wavelength for each of the other of the second plurality of optical switches.

The first plurality of optical switches may share the same first optical waveguide and or the second plurality of optical switches may share the same first optical waveguide. Thus, advantageously, the optical switching apparatus may act as a WDM multiplexer and or de-multiplexer.

In a preferred embodiment of the present invention, the same first optical waveguide shared by the first plurality of optical switches may be a different waveguide from the same first optical waveguide shared by the second plurality of optical switches. Thus, the first plurality of optical switches and the second plurality of optical switches may be configured to add/drop the same preselected wavelengths.

There is further provided an optical communications network node comprising the optical switching apparatus as described above.

In a preferred embodiment of the present invention, the optical communications network node may comprise a first output port, a second output port, a third input port and a fourth input port.

A first end of the first optical waveguide shared by the first plurality of optical switches may be coupled to the first output port and a second end of the first optical waveguide shared by the first plurality of optical switches may be coupled to the second output port. A first end of the first optical waveguide shared by the second plurality of optical switches may be coupled to the third input port and a second end of the first optical waveguide shared by the second plurality of optical switches may be coupled to the fourth input port.

The optical communications network node may further comprise a first control unit (e.g. a protection controller) configured to provide the first control signal and or the third control signal in response to an indication that a fault has occurred in the optical communications network.

The optical communications network node may further comprise a second control unit configured to provide the second control signal and or the fourth control signal.

According to the present invention, there is further provided an optical communications network comprising one or more optical communications network nodes as described above.

The optical communications network may be a radio access network. For example, the optical communications network may be a fronthaul and/or a backhaul network.

BRIEF DESCRIPTION OF THE DRAWINGS

Embodiments of the present invention will now be described, by way of example only, with reference to the accompanying drawings in which.

DESCRIPTION

Figure 1:
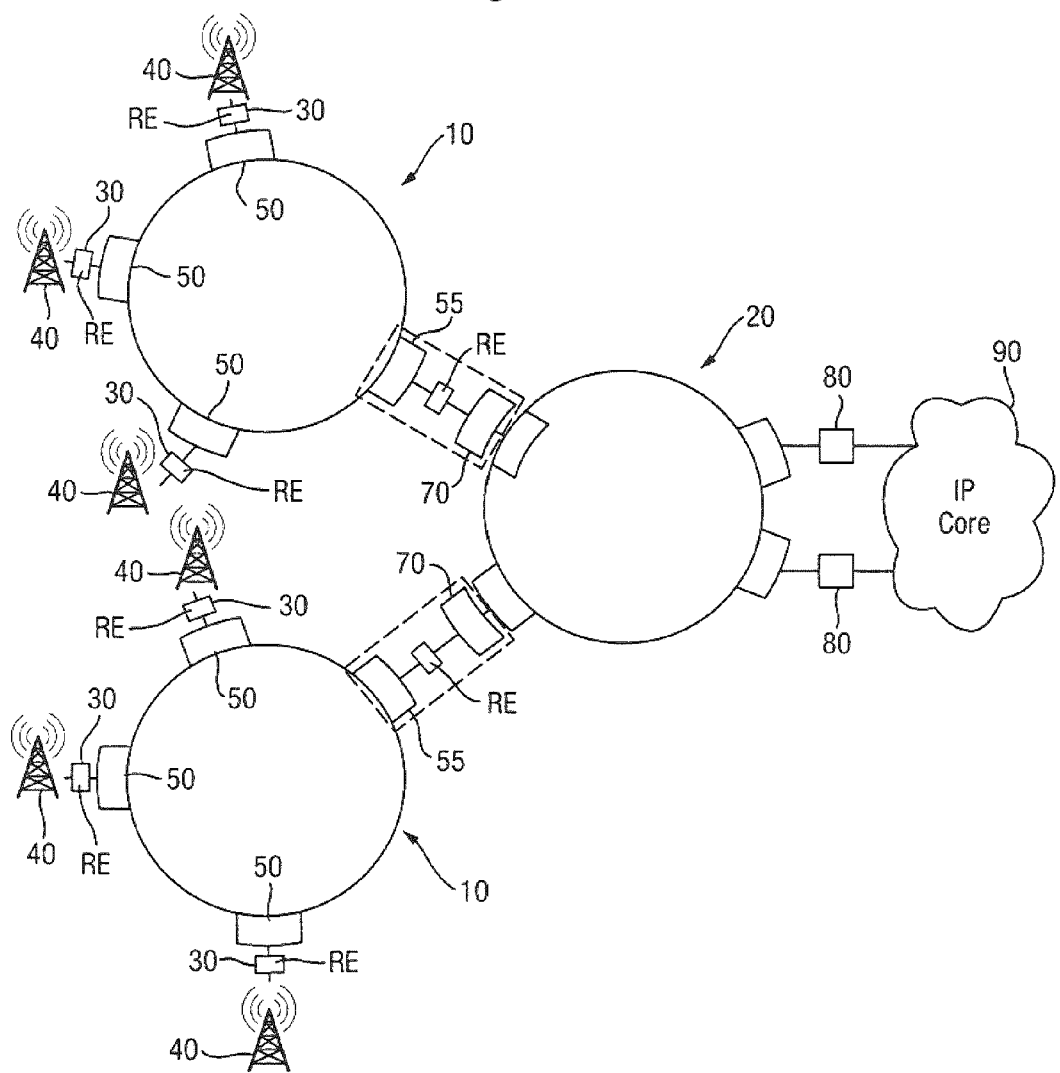
FIG. 1 illustrates a radio access network.
Figure 2A:
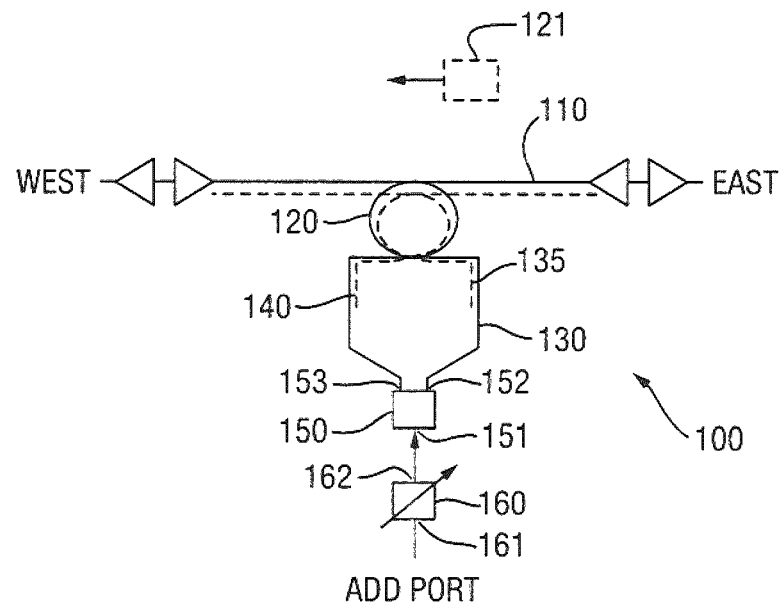
FIG. 2a illustrates an optical add switch according to a first embodiment of the present invention.

FIG. 2a illustrates an optical add switch 100 according to a first preferred embodiment of the present invention.

The optical add switch 100 comprises a first optical waveguide 110. The optical add switch 100 further comprises a micro-ring resonator 120, a first optical add path 130 and a second optical add path 140. The micro-ring resonator 120 is operable to add a first optical signal at a preselected wavelength received from the first optical add path 130 to the first optical waveguide 110 to travel in a first direction through the first optical waveguide. The micro-ring resonator 120 is further operable to add a second optical signal at the preselected wavelength received from the second optical add path 140 to the first optical waveguide 110 to travel in a second direction through the first optical waveguide 110 opposite to the first direction. The micro-ring resonator 120 is preconfigured such that it can operate in this manner.

In this example, this first optical waveguide 110 has a first end, labelled WEST and a second end, labelled EAST. Optical signals travelling from the first end of the first optical waveguide 110 to the second end of the first optical waveguide 110 (i.e. from WEST to EAST) will be said to be travelling in a "first" direction though the first optical waveguide 110. Optical signals travelling from the second end of the first optical waveguide 110 to the first end of the first optical waveguide (i.e. from EAST to WEST) will be said to be travelling in a "second" direction through the first optical waveguide 110.

The micro-ring resonator 120 is arranged adjacent the first optical waveguide 110 at a point intermediate its first end and its second end. Thus, in this example, an optical signal, from the first optical add path 130, added by the micro-ring resonator 120 to travel in the first direction through the first optical waveguide 110, travels from the micro-ring resonator 120, through the first optical waveguide 110, to the second end of the first optical waveguide 110. An optical signal added by the micro-ring resonator 120, from the second optical add path 140, to travel in the second direction through the first optical waveguide 110, travels from the micro-ring resonator 120, through the first optical waveguide 110, to the first end of the first optical waveguide 110.

In this example, as illustrated by the dashed lines, the micro-ring resonator 120 is arranged such that the first optical signal, received from the first optical add path 130, passes in a clockwise direction around at least a portion of the micro-ring resonator 120, and the second optical signal, received from the second optical add path 140, passes in an anticlockwise direction around at least a portion of the micro-ring resonator 120.

In this embodiment of the present invention, the first optical add path 130 and the second optical add path 140 comprise a single (second) optical waveguide 135. The second optical waveguide 135 has a first end and a second end. The first optical add path 130 comprises a first portion (or length) of the second optical waveguide 135 (in this example a first half of the second optical waveguide). The second optical add path 140 comprises a second portion (or length) of the second optical waveguide 135 (in this example the second half of the second optical waveguide).

The micro-ring resonator 120 is similarly arranged adjacent the second optical waveguide 135 at a point intermediate its first end and its second end. This point defines the intersection between the first and second portions of the second optical waveguide 135. Thus, the second optical waveguide 135 is arranged such that the first optical signal travels in a first direction through the first portion of the second optical waveguide 135 (i.e. the first optical add path 130) and the second optical signal travels in a second direction through the second portion of the second optical waveguide 135 (i.e. the second optical add path 140) opposite to the first direction. Note that, in this example, the first and second directions referred to with respect to the second optical waveguide 135 are in the opposite directions respectively to the first and second directions referred to above with respect to the first optical waveguide 110.

In this preferred embodiment of the present invention, the optical add switch 100 further comprises an optical coupling apparatus 150. The optical coupling apparatus 150 has an input 151 (e.g. an input port) configured to receive an optical signal, a first output 152 (e.g. a first output port) coupled to the first optical add path 130 and a second output 153 (e.g. a second output port) coupled to the second optical add path 140.

Thus, in this example, the first end of the second optical waveguide 135 is coupled to the first output 152, and the second end of the second optical waveguide 135 is coupled to the second output 153.

This embodiment is advantageous since, as explained above, it means that an optical signal to be added to the first optical waveguide 110 can be provided to a single or common input, whether the optical signal is to be added to travel in the first and or second direction through the first optical waveguide 110. However, it will be appreciated that, in alternative embodiments, the optical add switch 100 may not comprise an optical coupling apparatus 150, and may for example, alternatively, comprise two inputs configured to receive a respective optical signals and coupled to the first and second optical add paths 130, 140 respectively.

The optical coupling apparatus 150 may comprise an optical power splitter. The optical power splitter may be a passive device. In this example, an optical signal received at the input 151 of the optical coupling apparatus 150 is split into a first optical signal and a second optical signal. Each optical signal has only a portion of the optical power of the optical signal received by the optical coupling apparatus 150 at input 151, but has the same wavelength as the received optical signal. The optical power splitter is configured such that the first optical signal is output from the first output 152, to the first optical add path 130, and the second optical signal is output from the second output 153, to the second optical add path 140.

Thus, in this example, the input 151 of the optical coupling apparatus 150 is optically coupled simultaneously to the first output 152, and therefore to the first optical add path 130, and to the second output 153, and therefore to the second optical add path 140. Optical signals may therefore be added to the first optical waveguide 110 to travel in the first and second directions respectively, simultaneously.

Alternatively, the optical coupling apparatus 150 may comprise an optical switch element, which is configured to selectively couple the input 151 of the optical coupling apparatus 150 to its first output 152 or to its second output 153.

The optical switch element may have a first state in which the optical switch element is configured to selectively output an optical signal received at the input 151, from the first output 152 (and therefore to the first optical add path 130) and a second state in which the optical switch element is configured to selectively output an optical signal received at the input 151, from the second output 153 (and therefore to the second optical add path 140).

The optical switch element may further be configured to receive a control signal (which will be referred to as a first control signal) and to switch between the first and second states in dependence on the first control signal, as will be described in more detail below.

In this example, the optical add switch 100 further comprises an optical power adjustor 160. The optical power adjustor 160 is configured to receive an optical signal, at an input 161 (e.g. an input port), adjust the power of the optical signal and pass the power adjusted optical signal, from an output 162 (e.g. an output port) to the input 151 of the optical coupling apparatus 150. The optical power adjustor 160 may an optical attenuator. In this example, the optical power adjustor 160 is further configured to receive a control signal and to adjust the power of the optical signal in dependence on the received control signal.

In this example, the optical add switch 100 may further comprise a control element 121. This control element 121 may for example comprise a heater located above the micro-ring resonator 120, or the control element 121 could be an integrated part of the micro-ring resonator 120. As will be understood by those skilled in the art, activating current in the heater (e.g. increasing or decreasing the amount of current in the heater) will change the temperature of the micro-ring resonator 120, and consequently the resonance wavelength of the micro-ring resonator 120.

When the micro-ring resonator 120 is "in channel" (referred to as an active state), the micro-ring resonator 120 is configured to add a first optical signal at the preselected wavelength, received from the first optical path 130, to travel in a first direction through the first optical waveguide 110 and to add a second optical signal at the preselected wavelength, received from the second optical add path 140, to travel in a second direction through the first optical waveguide 110.

When the resonance of the micro-ring resonator 120 is "out of channel" however, for example because the heater has increased the temperature of the micro-ring resonator 120 such that the micro-ring resonator 120 is shifted "out of channel", the micro-ring resonator 120 is not configured to add a first optical signal at the preselected wavelength, received from the first optical path 130, to travel in a first direction through the first optical waveguide 110 or to add a second optical signal at the preselected wavelength, received from the second optical add path 140, to travel in a second direction through the first optical waveguide 110. This state is referred to as inactive state.

In the inactive state, the micro-ring resonator 120 is further configured to allow optical signals at the preselected wavelength to pass (in either direction) along the first optical waveguide, from an end of the first optical waveguide 110 to the other end of the first optical waveguide 110.

In both the inactive and active states, the micro-ring resonator 120 is further configured to allow optical signals at wavelengths other than the preselected wavelength to pass (in either direction) along the first optical waveguide 110, from an end of the first optical waveguide 110 to the other end of the first optical waveguide 110.

Further, in this example, the control element 121 (e.g. the heater) may be configured to receive a control signal (which will be referred to as a second control signal), and to cause the micro-ring resonator 120 to switch between the active state and the inactive state in dependence on the second control signal.

Figure 2B:
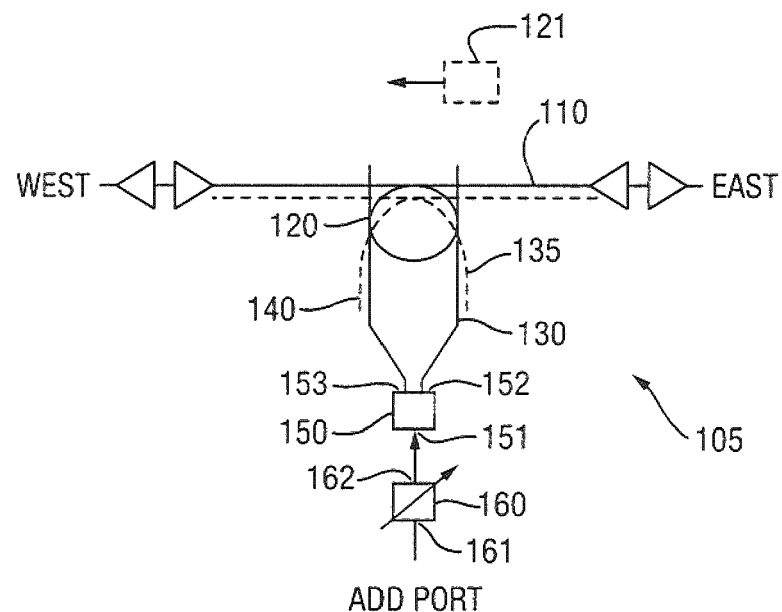
FIG. 2b illustrates an optical add switch according to a second embodiment of the present invention.

FIG. 2b illustrates an optical add switch 105 according to a second preferred embodiment of the present invention. The same reference numerals are used in FIG. 2b as in FIG. 2a. The main difference between FIG. 2b and FIG. 2a is that, instead of the first optical add path 130 and the second optical add path 140 comprising respective portions of the same second optical waveguide, in FIG. 2a, the first optical add path 130 comprises a second optical waveguide and the second optical add path 140 comprises a third (different) optical waveguide.

It should be noted that the micro-ring resonator 120 is arranged such that the first optical signal, received from the first optical add path 130, passes in a anticlockwise direction around at least a portion of the micro-ring resonator 120, and the second optical signal, received from the second optical add path 140, passes in an clockwise direction around at least a portion of the micro-ring resonator 120.

Further, it follows that, in this example, the first output 153 (e.g. first output port) of the optical coupling apparatus 150 is coupled to a first end of the second optical waveguide. The second output 152 (e.g. second output port) of the optical coupling apparatus 150 is coupled to a first end of the third optical waveguide.

An optical drop switch 170 according to a first embodiment of the present invention will now be described with respect to FIG. 3a.

The optical drop switch 170 comprises a first optical waveguide 110, a first optical drop path 180, a second optical drop path 190 and a micro-ring resonator 125. The micro-ring resonator 125 is operable to drop a first optical signal at a preselected wavelength travelling in a first direction (in this example from WEST to EAST) through the first optical waveguide 110 to the first optical drop path 180 and to drop a second optical signal at the preselected wavelength travelling in a second direction (in this example from EAST to WEST) through the first optical waveguide 110 opposite to the first direction to the second optical drop path 190. The micro-ring resonator 120 is preconfigured such that it can operate in this manner.

In this example, the micro-ring resonator 125 is arranged such that the first optical signal, dropped from the first optical waveguide 110, passes in a anticlockwise direction around at least a portion of the micro-ring resonator 125, and the second optical signal, dropped from the first optical waveguide 110, passes in a clockwise direction around at least a portion of the micro-ring resonator 125.

In this first embodiment, similarly to the first embodiment of the optical add switch 100 shown in FIG. 2a, the first optical drop path 180 and the second optical drop path 190 comprise respective portions (or lengths) of a same second optical waveguide 185 (having first and second ends). The first optical drop path 180 comprises a first portion of the second optical waveguide 185 and the second optical drop path 190 comprises a second portion of the second optical waveguide 185. The second optical waveguide is arranged such that the first optical signal travels in a first direction through the first portion of the second optical waveguide and the second optical signal travels in a second direction through the second portion of the second optical waveguide opposite to the first direction.

Figure 3A:
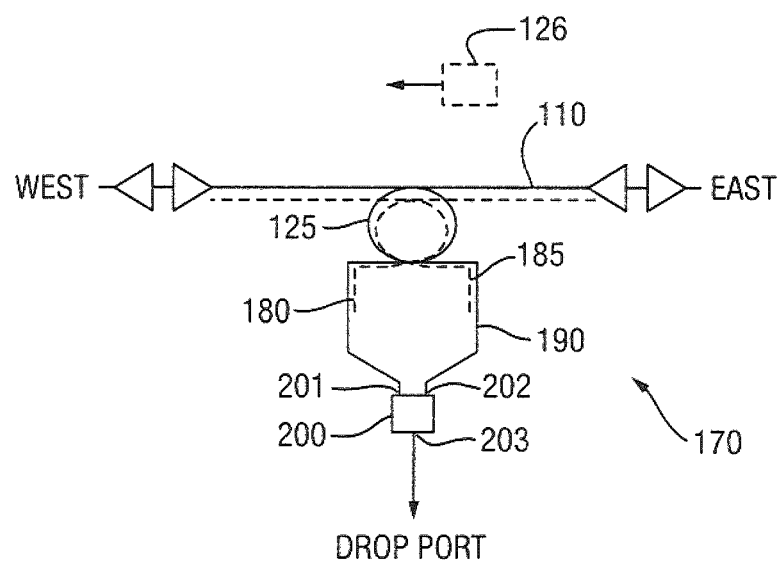
FIG. 3a illustrates an optical drop switch according to a first embodiment of the present invention.
Figure 3B:
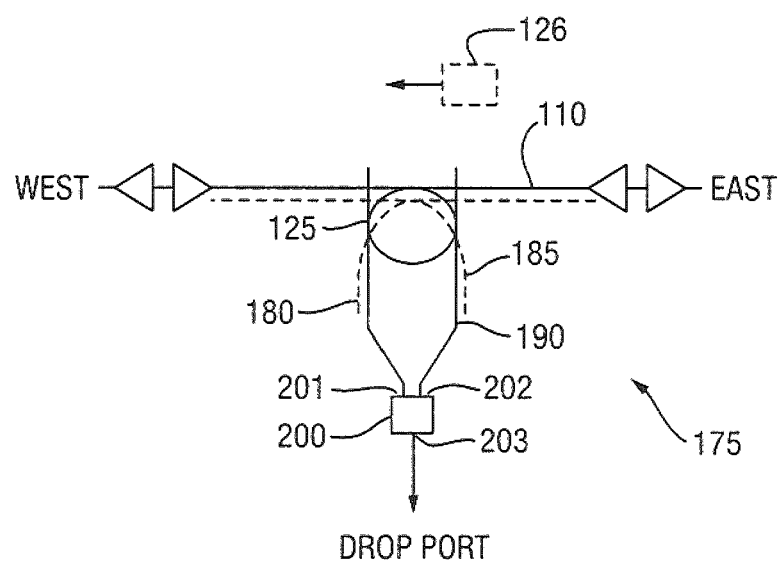
FIG. 3b illustrates an optical drop switch according to a second embodiment of the present invention.

In an alternative embodiment, however, as shown in FIG. 3b, the first optical drop path 180 and the second optical drop path 190 may instead comprise respective optical waveguides. For example, the first optical drop path 180 may comprise a second optical waveguide and the second optical drop path 190 may comprise a third, different optical waveguide.

In these preferred embodiments of the present invention, the optical drop switch 170/175 further comprises an optical coupling apparatus 200. The optical coupling apparatus 200 has a first input 201 (e.g. a first input port), a second input 202 (e.g. a second input port), and a single output 203 (e.g. an output port). The first input 201 is coupled to the first optical drop path 180. The second input 202 is coupled to the second optical drop path 190, and the output 203 is configured to output an optical signal.

Thus, in the embodiment of FIG. 3a, the first input 201 is coupled to the first end of the second optical waveguide 185 and the second input 202 is coupled to the second end of the second optical waveguide 185. In the embodiment of the FIG. 3b, the first input 201 is coupled to a first end of the second optical waveguide, and the second input 202 is coupled to a first end of the third optical waveguide.

This embodiment is advantageous since, as explained above, it means that optical signals dropped by the optical drop switch 170/175 may be output from a single or common output port, regardless in which direction they were travelling through the first optical waveguide 110. However, it will be appreciated that, in alternative embodiments, the optical drop switch 170/175 may not comprise an optical coupling apparatus 200, and may instead include two outputs (e.g. output ports) configured to output signals dropped via the first and second optical drop paths 180, 190 respectively.

The optical coupling apparatus 200 may be configured to optically couple both the first input 201 (and therefore the first optical drop path 180) and the second input 202 (and therefore the second optical drop path 190) to the output 203 simultaneously.

Alternatively, the optical coupling apparatus 200 may comprise an optical switch element configured to selectively couple either the first input 201 or the second input 202 to the output 203. The optical switch element has a first state in which the optical switch element is configured to selectively output an optical signal received at the first input 201 from the output 203. The optical switch element may further have a second state in which the optical switch element is configured to selectively output an optical signal received at the second input 202 from the output 203. In this example, the optical switch element is further configured to receive a control signal (which will be referred to as a third control signal) and to switch between the first and second states in dependence on the third control signal.

In this example, the optical drop switch 170 also comprises a control element 126. As described above, this control element 126 may for example comprise a heater located above the micro-ring resonator 125, or the control element 126 could be an integrated part of the micro-ring resonator 120. As will be understood by those skilled in the art, activating current in the heater (e.g. increasing or decreasing the amount of current in the heater) will change the temperature of the micro-ring resonator 120, and consequently the resonance wavelength of the micro-ring resonator 120.

Thus, if the micro-ring resonator 125 is "in channel", and therefore active, the micro-ring resonator 125 is configured to drop a first optical signal at the preselected wavelength travelling in the first direction through the first optical waveguide 110 to the first optical drop path 180 and to drop a second optical signal at the preselected wavelength travelling in the second direction through the first optical waveguide 110 to the second optical drop path 190.

If however the micro-ring resonator 125 is "out of channel", and therefore inactive, the micro-ring resonator 125 will not be configured to drop a first optical signal at the preselected wavelength travelling in the first direction through the first optical waveguide 110 to the first optical drop path 180 or to drop a second optical signal at the preselected wavelength travelling in the second direction through the first optical waveguide 110 to the second optical drop path 190.

In both the active and inactive states, the micro-ring resonator 125 is further configured to not drop optical signals (whether travelling in the first direction or the second direction through the first optical waveguide 110) which are not at the preselected wavelength. That is, the micro-ring resonator 125 is configured to allow optical signals at wavelengths other than the preselected wavelength to pass from a first end of the first optical waveguide 110 to the other end of the first optical waveguide 110.

In this example, the control element 126 (e.g. a heater) is configured to receive a control signal (which will be referred to as a fourth control signal) and to cause the micro-ring resonator to switch between the active state and the inactive state in dependence on the fourth control signal.

Note that, advantageously, each of the above-described optical add switches 100, 105/optical drop switches 170, 175 may be implemented in an integrated, single silicon photonic device (e.g. a chip).

Figure 4:
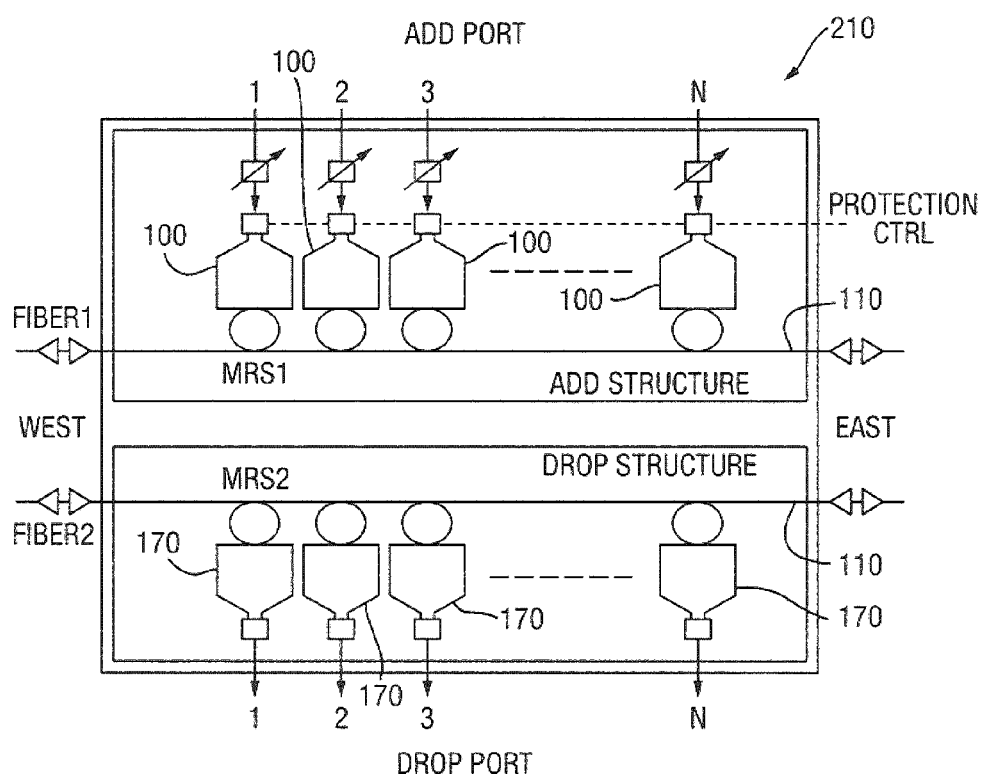
FIG. 4 illustrates an optical switching apparatus according to a preferred embodiment of the present invention.

FIG. 4 illustrates an example of an optical switching apparatus 210 according to a preferred embodiment of the present invention, comprising a first plurality of optical add switches 100 embodying the present invention, and a second plurality of optical drop switches 170 embodying the present invention.

In this example, each of the optical add switches 100 is an optical add switch 100 as described above with respect to FIG. 2a. However, all or some of the first plurality of optical add switches 100 may instead be an optical add switch 105 as described above with respect to FIG. 2b or any other optical add switch embodying the present invention. Similarly, in this example, each of the optical drop switches 100 is an optical drop switch 100 as described above with respect to FIG. 3a. However, all or some of the first plurality of optical drop switches 170 may instead be an optical drop switch 175 as described above with respect to FIG. 3b or any other optical drop switch embodying the present invention.

Each of the first plurality of optical (add) switches 100 is operable to add optical signals at a different preselected wavelength from the other one or more of the first plurality of optical switches 100 to the first optical waveguide 110. Similarly, each of the second plurality of optical (drop) switches 170 is operable to drop optical signals at a different preselected wavelength from the other one or more of the second plurality of optical switches 170. These preselected wavelengths may be referred to as $\lambda 1, \lambda 2 \ldots \lambda n$. In this example, the preselected wavelengths which may be added by the first plurality of optical switches 100 are the same preselected wavelengths which may be dropped by the second plurality of optical switches 170.

Further, in this example, the first plurality of optical (add) switches 100 share the same first optical waveguide 110, and the second plurality of optical (drop) switches 170 share the same first optical waveguide 110. However, the same first optical waveguide 110 shared by the second plurality of optical (drop) switches 170 is a different optical waveguide from the same first optical waveguide shared by the first plurality of optical (add) switches 100.

Figure 5:
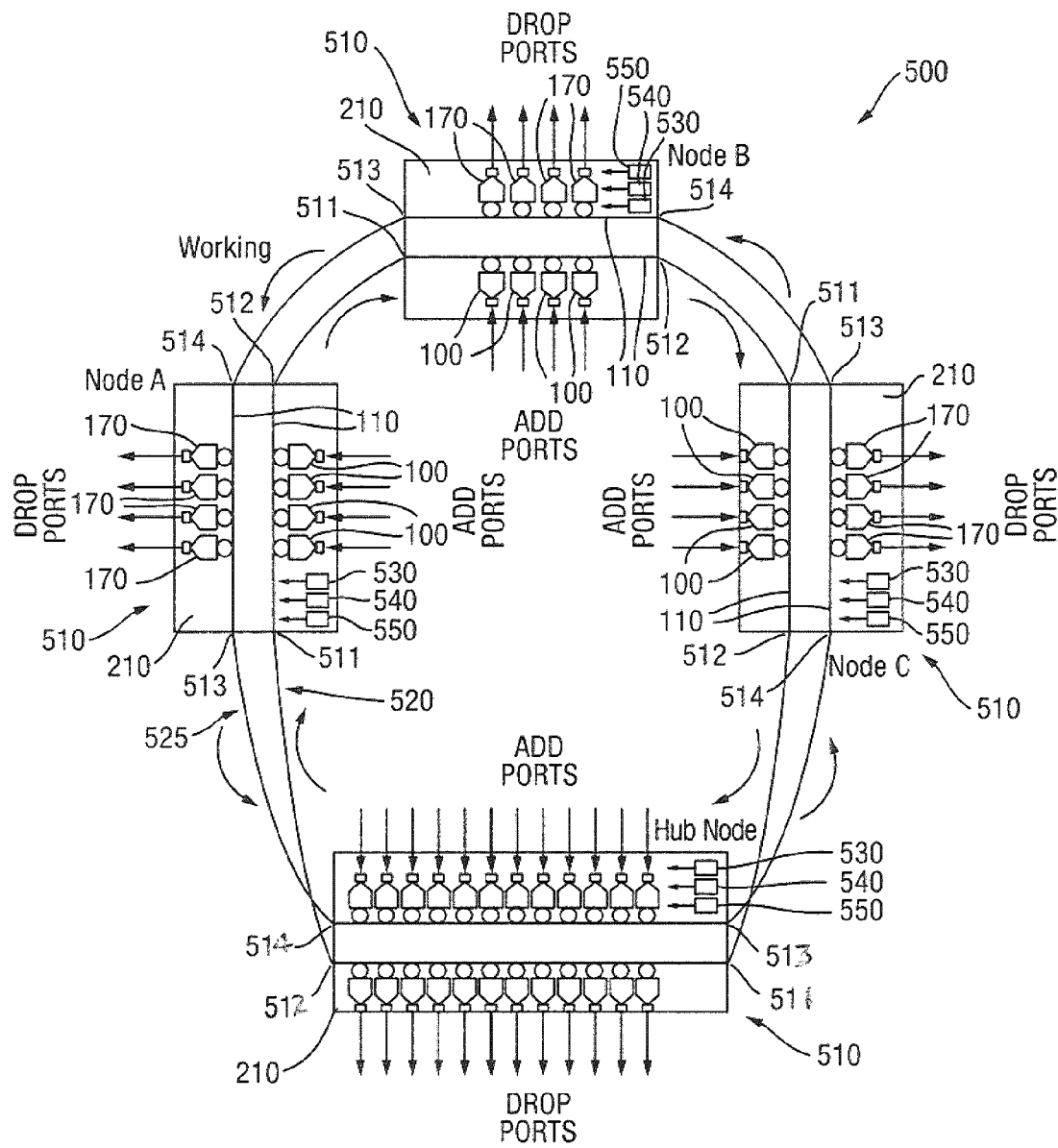
FIG. 5 shows an optical communications network comprising a plurality of nodes each comprising an optical switching apparatus according to a preferred embodiment of the present invention in a working mode.

FIG. 5 shows an optical communications network (in particular a WDM optical ring network) 500. This optical communications network 500 may be a radio access network. However, alternatively, the optical communications network 500 may be a different type of communications network.

In this example, the optical communications network 500 comprises a plurality of optical communications nodes 510: node A, node B, node C and a hub node.

Each of nodes A, B and C 510 comprises an optical switching apparatus 210 as described above. In this example, node A has four optical add switches 100 and four optical drop switches 170, configured to add/drop wavelengths at wavelengths: λ1, λ2, λ3 and λ4 respectively. Node B has four optical add switches 100 and four optical drop switches 170 configured to add/drop wavelengths at wavelengths: λ5, λ6, λ7 and λ8 respectively. Node C has four optical add switches 100 and four optical drop switches 170 configured to add/drop wavelengths at wavelengths: λ9, λ10, λ11 and λ12 respectively.

Hub node 510 also comprises an optical switching apparatus 210 as described above. However, hub node 510 has twelve optical add switches 100 (not shown) and twelve optical drop switches 170 (not shown) configured to add/drop wavelengths λ1 to λ12 respectively.

Each node 510 comprises a first input/output port 511, a second input/output port 512, a third input/output port 513 and a fourth input/output port 514, which are each configured for coupling to an optical communications link (for example to an optical fibre).

In each of nodes A, B and C 510, the first and second ends of the first optical waveguide 110 shared by the first plurality of optical (add) switches 100 are coupled to that node's first input/output port 511 and second input/output port 512 respectively. The first and second ends of the first optical waveguide 110 shared by the second plurality of optical (drop) switches 170 are coupled to that node's third input/output port 513 and fourth input/output port 514 respectively.

However, in hub node 510, the first and second ends of the first optical waveguide 110 shared by the first plurality of optical (add) switches 100 are coupled to its third input/output port 513 and fourth/input output port 514 respectively. The first and second ends of the first optical waveguide 110 shared by the second plurality of optical (drop) switches 170 is coupled to its first input/output port 511 and second input/output port 512 respectively.

In this example, the optical communications network 500 further comprises a first optical fibre ring 520 (which may be referred to as an inner optical fibre ring), and a second optical fibre ring 525 (which may be referred to as an outer optical fibre ring).

Each optical fibre ring 520, 525 comprises a plurality of fibre segments, which couple hub node 510 to node A 510, node A 510 to node B 510, node B 510 to node C 510, node C 510 to hub node 510 respectively. The fibre segments of the first optical fibre ring 520 (the inner ring) couple the first input/output port 511 of each node 510 to the second input output/port 512 of the next node 510. The fibre segments of the second optical fibre ring 525 (the outer ring) couple the third input/output port 513 of each node 510 to the fourth input/output port of the next node 510.

Thus, optical signals added by the hub node 510 to its first (add) optical waveguide 110 (which will be referred to as downstream signals) will travel through the second optical fibre ring 525 (i.e. the outer ring), from which they may be dropped by nodes A, B, C 510. The optical signals added by nodes A, B and C 510 to their first (add) optical waveguides 110 (which will be referred to as upstream signals), however, will travel through the first optical fibre ring 520 (i.e. the inner ring), from which they may be dropped by the hub node 510.

In this example, each of the nodes 510 further comprises a plurality of transmitters (not shown), each configured to generate an optical signal at one of the node's preselected wavelengths. Further, each of the nodes 510 comprises a plurality of receivers (not shown), each arranged to receive the optical signals dropped by a respective one of the node's optical drop switches 170.

Each of the nodes 510 may further comprise a first control unit (which will be referred to as a protection controller) 530, a second control unit 540 and a third control unit 550. Each of these control units 530, 540, 550 may comprise a processor (e.g. processing circuitry), and may be implemented in any combination of software and or hardware. Each control unit 530, 540, 550 may comprise one or more units, integrated to any degree.

If the optical coupling apparatus 150 in each of the first plurality of optical (add) switches 100 comprises a switch element as described above, then the first control unit 530 may be configured to provide a first control signal, as described above, to the switch element in each of the optical add switches 100. For example, these first control signals may be provided in response to an indication that a fault has occurred in the optical communications network 500.

In addition, or alternatively (for example if the optical coupling apparatus 150 in each of the optical add switches 100 comprises a power splitter instead of a switch element), if the optical coupling apparatus 200 in each of the second plurality of optical (drop) switches 170 comprises a switch element as described above, then the first control unit 530 may be configured to provide a third control signal, as described above, to the switch element in each of the optical drop switches 170. For example, these third control signals may be provided in response to an indication that a fault has occurred in the optical communications network 500.

The second control unit 540 may be configured to provide a second control signal, as described above, to the control element 121 in each of the first plurality of optical (add) switches 100. The second control unit 540 may further be configured to provide a fourth control signal, as described above, to the control element 126 in each of the second plurality of optical (drop) switches 100, 170.

The third control unit 550 may be configured to provide a control signal, as described above, to the optical power adjustor 161 of each of the first plurality of optical (add) switches 100.

Thus, advantageously, the second control units 540 may, dynamically, change which and or how many wavelengths are dropped/added by each node 510, for example in dependence on the amount of traffic to be transmitted from/to each node 510.

Further, protection may be achieved in the event of a fault in the optical communications network 500 (for example a fibre cut).

FIG. 5 illustrates an example of the optical communications network 500 in working mode. In this example, each of the optical add switches 100 has an optical coupling apparatus 150 comprising a switch element as described above.

Hub node 510 adds a WDM downstream signal to travel in an anticlockwise direction around the outer optical fibre ring 530. Each node A, B and C 510 drops its one or more wavelengths (i.e. the preselected wavelengths of its active micro-ring resonators 125), and allows the other wavelengths to pass further around the outer optical fibre ring 530. Each node A, B, C 510 adds its upstream wavelengths (i.e. optical signals at the preselected wavelengths of its active micro-ring resonators 120) to travel in a clockwise direction around the inner optical fibre ring 520, to hub node 510, which drops the wavelengths.

Figure 6:
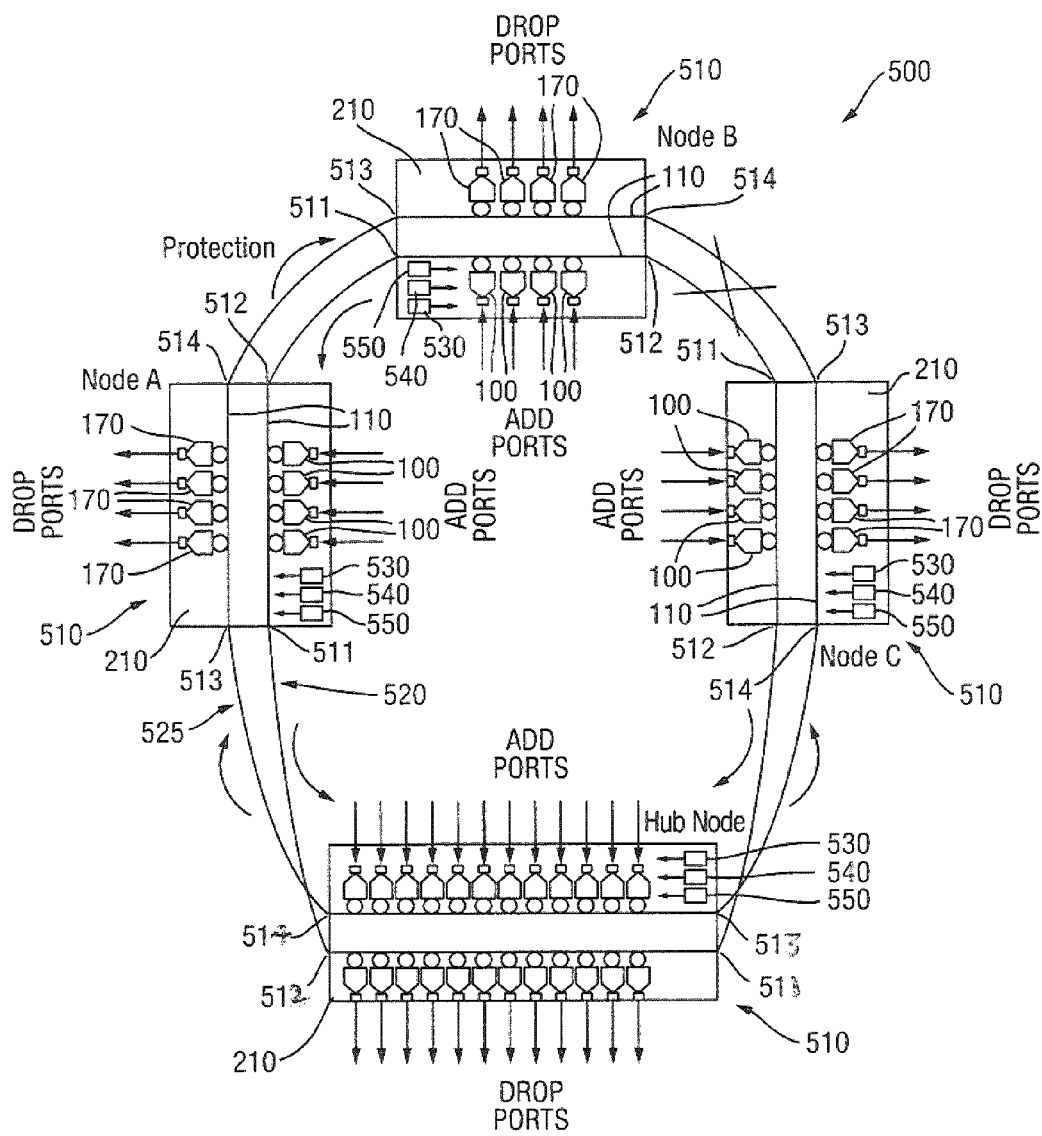
FIG. 6 shows the optical communications network in protection mode.

FIG. 6 shows an example of the optical communications network 500 in protection mode. In this example, an optical fibre cut has occurred in the optical fibre segments of the inner and outer optical fibre rings 520, 525 between nodes B and C 510. This fault may be detected in a number of ways as will be understood by those skilled in the art, for example by signal monitor blocks (not shown) in each node 510.

In this example, hub node 510 continues to add its downstream wavelength(s) for node C 510, to travel in the anticlockwise direction around the outer fibre ring 530. However, hub node 510 instead adds its downstream wavelength(s) for nodes A and B 510, to travel in the clockwise direction around the outer fibre ring 530. Node C 510 continues to add its upstream wavelength(s) to travel in the clockwise direction around the inner fibre ring 520. However, nodes A and B 510 add their upstream wavelength(s) to travel in an anticlockwise direction around the inner fibre ring 520.

This may be achieved by providing first control signals to the (add) switch elements of the affected downstream/upstream signals, in this example in the hub node 510 and nodes A and B.

In an alternative embodiment, however, where the optical coupling apparatus 150 of the optical add switches 100 comprises a power splitter, in both working and protection modes, the downstream and upstream optical signals may instead be transmitted in both directions (i.e. clockwise and anticlockwise) around the respective optical fibre ring 520, 525. In this case, however, the optical coupling apparatus 200 in each of the optical drop switches 170 may comprise a switch element, such that in the working mode only one of the optical signals is received by the node (and interference does not occur). Further, in this case, protection may be achieved by providing third control signals to the (drop) switch elements of the downstream/upstream signals affected by the failure (for example in FIG. 6, in hub node 510, node A and node B).

Thus, advantageously, embodiments of the present invention enable protection to be achieved in an optical communications network (in particular a WDM network). Moreover, this may be achieved using more cost effective, power efficient and less bulky optical switches. Advantageously, in embodiments of the present invention, a single micro-ring resonator can be used to add optical signals to travel in either or both directions through a first optical waveguide, or to drop optical signals which travel in either or both directions through a first optical waveguide. Further, in preferred embodiments of the present invention, by including a plurality of optical add (or drop) switches embodying the present invention sharing the same first optical waveguide, the bandwidth of optical signals added (or dropped) may, advantageously, be selectively increased.

The invention claimed is:

1. An optical switch, comprising:
a first optical waveguide;
a first optical add path;
a second optical add path; and
a micro-ring resonator operable to add a first optical signal at a preselected wavelength received from the first optical add path to the first optical waveguide to travel in a first direction through the first optical waveguide, and to add a second optical signal at the preselected wavelength received from the second optical add path to the first optical waveguide to travel in a second direction through the first optical waveguide opposite to the first direction, and
an optical coupling apparatus have an input configured to receive an optical signal, a first output coupled to the first optical add path and a second output coupled to the second optical add path; wherein the optical coupling apparatus comprises an optical switch element having a first state in which the optical switch element is configured to selectively output the received optical signal from the first output and a second state in which the optical switch element is configured to selectively output the received optical signal from the second output.

2. The optical switch according to claim 1, wherein the micro-ring resonator is arranged such that the first optical signal, received from the first optical add path, passes in a clockwise direction around at least a portion of the micro-ring resonator, and the second optical signal, received from the second optical add path, passes in an anticlockwise direction around at least a portion of the micro-ring resonator.

3. The optical switch according to claim 1, wherein the first optical add path comprises a first portion of a second optical waveguide and the second optical add path comprises a second portion of the second optical waveguide, and the second optical waveguide is arranged such that the first optical signal travels in a first direction through the first portion of the second optical waveguide and the second optical signal travels in a second direction through the second portion of the second optical waveguide opposite to the first direction.

4. The optical switch according to claim 1, wherein the first optical add path comprises a second optical waveguide and the second optical add path comprises a third, different optical waveguide.

5. The optical switch according to claim 1, wherein the optical switch element is further configured to receive a first control signal and to switch between the first and second states in dependence on the first control signal.

6. The optical switch according to claim 5, wherein the optical switch further comprises an optical power adjustor configured to receive an optical signal, adjust the power of the optical signal and pass the power adjusted optical signal to the input of the optical coupling apparatus.

7. The optical switch according to claim 6, wherein the optical power adjustor is configured to receive a control signal and to adjust the power of the optical signal in dependence on the received control signal.

8. The optical switch according to claim 1, wherein the micro-ring resonator has an active state in which the micro-ring resonator is configured to add a first optical signal at the preselected wavelength received from the first optical add path to the first optical waveguide to travel in a first direction through the first optical waveguide, and to add a second optical signal at the preselected wavelength received from the second optical add path to the first optical waveguide to travel in a second direction through the first optical waveguide opposite to the first direction, and an inactive state in which the micro-ring resonator is not configured to add a first optical signal at a preselected wavelength received from the first optical add path to the first optical waveguide to travel in a first direction through the first optical waveguide or to add a second optical signal at the preselected wavelength received from the second optical add path to the first optical waveguide to travel in a second direction through the first optical waveguide opposite to the first direction, and the optical switch further comprises:
a control element configured to receive a second control signal and to cause the micro-ring resonator to switch between the active state and the inactive state in dependence on the second control signal.

9. An optical switch, comprising:
a first optical waveguide;
a first optical drop path;
a second optical drop path; and
a micro-ring resonator operable to drop a first optical signal at a preselected wavelength travelling in a first direction through the first optical waveguide to the first optical drop path and to drop a second optical signal at the preselected wavelength travelling in a second direction through the first optical waveguide opposite to the first direction to the second optical drop path and
an optical coupling apparatus having a first input coupled to the first optical drop path, a second input coupled to the second optical drop path and an output configured to output an optical signal, wherein the optical coupling apparatus comprises an optical switch element having a first state in which the optical switch element is configured to selectively output an optical signal received at the first input from the output and a second state in which the optical switch element is configured to selectively output an optical signal received at the second input from the output.

10. The optical switch according to claim 9, wherein the micro-ring resonator is arranged such that the first optical signal, dropped from the first optical waveguide, passes in a clockwise direction around at least a portion of the micro-ring resonator, and the second optical signal, dropped from the first optical waveguide, passes in an anticlockwise direction around at least a portion of the micro-ring resonator.

11. The optical switch according to claim 9, wherein the first optical drop path comprises a first portion of a second optical waveguide and the second optical drop path comprises a second portion of the second optical waveguide, and the second optical waveguide is arranged such that the first optical signal travels in a first direction through the first portion of the second optical waveguide and the second optical signal travels in a second direction through the second portion of the second optical waveguide opposite to the first direction.

12. The optical switch according to claim 9, wherein the first optical drop path comprises a second optical waveguide and the second optical drop path comprises a third, different optical waveguide.

13. The optical switch according to claim 9, further comprising an optical coupling apparatus having a first input coupled to the first optical drop path, a second input coupled to the second optical drop path and an output configured to output an optical signal.

14. The optical switch according to claim 9, wherein the micro-ring resonator has an active state in which the micro-ring resonator is configured to drop a first optical signal at the preselected wavelength travelling in a first direction through the first optical waveguide to the first optical drop path and to drop a second optical signal at the preselected wavelength travelling in a second direction through the first optical waveguide opposite to the first direction to the second optical drop path, and an inactive state in which the micro-ring resonator is not configured to drop a first optical signal at a preselected wavelength travelling in a first direction through the first optical waveguide to the first optical drop path or to not drop a second optical signal at the preselected wavelength travelling in a second direction through the first optical waveguide opposite to the first direction to the second optical drop path, and the optical switch further comprises:

a control element configured to receive a fourth control signal and to cause the micro-ring resonator to switch between the active state and the inactive state in dependence on the fourth control signal.

15. An optical switching apparatus comprising:
a first plurality of optical switches each comprising
a first optical waveguide;
a first optical add path;
a second optical add path; and
a micro-ring resonator operable to add a first optical signal at a preselected wavelength received from the first optical add path to the first optical waveguide to travel in a first direction through the first optical waveguide, and to add a second optical signal at the preselected wavelength received from the second optical add path to the first optical waveguide to travel in a second direction through the first optical waveguide opposite to the first direction, and
an optical coupling apparatus having an input configured to receive an optical signal, a first output coupled to the first optical add path and a second output coupled to the second optical add path; wherein the optical coupling apparatus comprises an optical switch element having a first state in which the optical switch element is configured to selectively output the received optical signal from the first output and a second state in which the optical switch element is configured to selectively output the received optical signal from the second output; and
a second plurality of optical switches each comprising:
a first optical waveguide;
a first optical drop path;
a second optical drop path;
a micro-ring resonator operable to drop a first optical signal at a preselected wavelength travelling in a first direction through the first optical waveguide to the first optical drop path and to drop a second optical signal at the preselected wavelength travelling in a second direction through the first optical waveguide opposite to the first direction to the second optical drop path and
an optical coupling apparatus having a first input coupled to the first optical drop path, a second input coupled to the second optical drop path and an output configured to output an optical signal, wherein the optical coupling apparatus comprises an optical switch element having a first state in which the optical switch element is configured to selectively output an optical signal received at the first input from the output and a second state in which the optical switch element is configured to selectively output an optical signal received at the second input from the output.

16. The optical switching apparatus according to claim 15, wherein the preselected wavelength for each of the first plurality of optical switches is different from the preselected wavelength for each of the other of the first plurality of optical switches and/or the preselected wavelength for each of the second plurality of optical switches is different from the preselected wavelength for each of the other of the second plurality of optical switches.

17. The optical switching apparatus according to claim 15, wherein the first plurality of optical switches share the same first optical waveguide and the second plurality of optical switches share the same first optical waveguide.

18. An optical communications network node comprising the optical switching apparatus according to claim 16.

19. The optical communications network node according to claim 18, further comprising a first control unit configured to provide the first control signal and or the third control signal in response to an indication that a fault has occurred in the optical communications network.

\* \* \* \* \*

UNITED STATES PATENT AND TRADEMARK OFFICE
CERTIFICATE OF CORRECTION

PATENT NO. : 9,806,841 B2
APPLICATION NO. : 15/313193
DATED : October 31, 2017
INVENTOR(S) : Testa et al.

Page 1 of 1

It is certified that error appears in the above-identified patent and that said Letters Patent is hereby corrected as shown below:

In the Claims

In Column 15, Line 65, in Claim 1, delete "have an" and insert -- having an --, therefor.

In Column 17, Line 11, in Claim 9, delete "path and" and insert -- path, and --, therefor.

In Column 18, Line 5, in Claim 15, delete "apparatus" and insert -- apparatus, --, therefor.

In Column 18, Line 6, in Claim 15, delete "comprising" and insert -- comprising: --, therefor.

In Column 18, Line 41, in Claim 15, delete "path and" and insert -- path, and --, therefor.

Signed and Sealed this
Sixteenth Day of April, 2019

Andrei Iancu
*Director of the United States Patent and Trademark Office*